(12) United States Patent
Faoro

(10) Patent No.: US 10,933,463 B2
(45) Date of Patent: Mar. 2, 2021

(54) APPARATUS, PLANT AND METHOD FOR PRODUCING INGOTS AND METAL BARS AND FOR MONITORING THE QUALITY THEREOF

(71) Applicant: IKOI S.P.A., Cassola (IT)

(72) Inventor: Giovanni Faoro, Bassano del Grappa (IT)

(73) Assignee: IKOI S.R.L., Cassola (IT)

( * ) Notice: Subject to any disclaimer, the term of this patent is extended or adjusted under 35 U.S.C. 154(b) by 0 days.

(21) Appl. No.: 16/733,727

(22) Filed: Jan. 3, 2020

(65) Prior Publication Data

US 2020/0215603 A1    Jul. 9, 2020

Related U.S. Application Data

(62) Division of application No. 15/308,773, filed as application No. PCT/EP2015/000920 on May 5, 2015, now abandoned.

(30) Foreign Application Priority Data

May 6, 2014    (IT) .......................... VI2014A000122

(51) Int. Cl.
  *B22D 7/06*    (2006.01)
  *G01N 1/12*    (2006.01)
  *B22D 7/00*    (2006.01)

(52) U.S. Cl.
  CPC ................. *B22D 7/06* (2013.01); *B22D 7/00* (2013.01); *B22D 7/005* (2013.01); *G01N 1/125* (2013.01)

(58) Field of Classification Search
  CPC ............. B22D 7/00; B22D 7/06; B22D 7/005
  See application file for complete search history.

(56) References Cited

U.S. PATENT DOCUMENTS

| 1,491,846 A | 4/1924 | Coates |
| 3,332,288 A * | 7/1967 | Mladenovich ....... G01N 1/1409 73/864.52 |

(Continued)

FOREIGN PATENT DOCUMENTS

| BE | 789 301 A1 | 1/1973 |
| CN | 101158696 A | 4/2008 |

(Continued)

*Primary Examiner* — Kevin P Kerns
*Assistant Examiner* — Steven S Ha
(74) *Attorney, Agent, or Firm* — Finnegan, Henderson, Farabow, Garrett & Dunner LLP

(57) ABSTRACT

An apparatus for producing metal bars and ingots with quality monitoring, includes at least one mold essentially constituted by a body that forms at least one cavity for forming an ingot or a bar and by at least one cover that is detachably associated with the body in order to upwardly close the cavity. The apparatus has at least one passage, provided on the body of the mold, on the cover or on both, for connecting the inside of the cavity to the outside even when the cover is associated with the body in order to upwardly close the cavity. The apparatus according to the invention also has the particularity that it includes a means for taking a sample of the melted material contained in a mold, constituted essentially by a body that forms at least one cavity for forming an ingot or a bar and by at least one cover that is detachably associated with the body in order to upwardly close the cavity. The present invention also relates to a plant and a method for producing metal bars and ingots with quality monitoring.

12 Claims, 5 Drawing Sheets

(56) References Cited

U.S. PATENT DOCUMENTS

| | | | | | |
|---|---|---|---|---|---|
| 3,915,014 | A | * | 10/1975 | Judge | G01N 1/1409 |
| | | | | | 73/864.54 |
| 4,237,734 | A | * | 12/1980 | McDevitt | G01N 1/125 |
| | | | | | 73/864.57 |
| 4,643,032 | A | * | 2/1987 | Lawrenz | G01N 1/125 |
| | | | | | 73/864.53 |
| 8,056,604 | B2 | | 11/2011 | Duncan | |
| 2013/0319090 | A1 | | 12/2013 | Prest et al. | |

FOREIGN PATENT DOCUMENTS

| | | | |
|---|---|---|---|
| CN | 202092895 U | * | 12/2011 |
| CN | 103547393 A | | 1/2014 |
| DE | 18 15 703 A1 | | 7/1970 |
| DE | 10 2006 047765 B3 | | 12/2007 |
| EP | 0 080 965 A2 | | 6/1983 |
| EP | 0 869 345 A2 | | 10/1998 |
| JP | 2003 048052 A | | 2/2003 |
| WO | WO 2012/130451 A1 | | 10/2012 |

\* cited by examiner

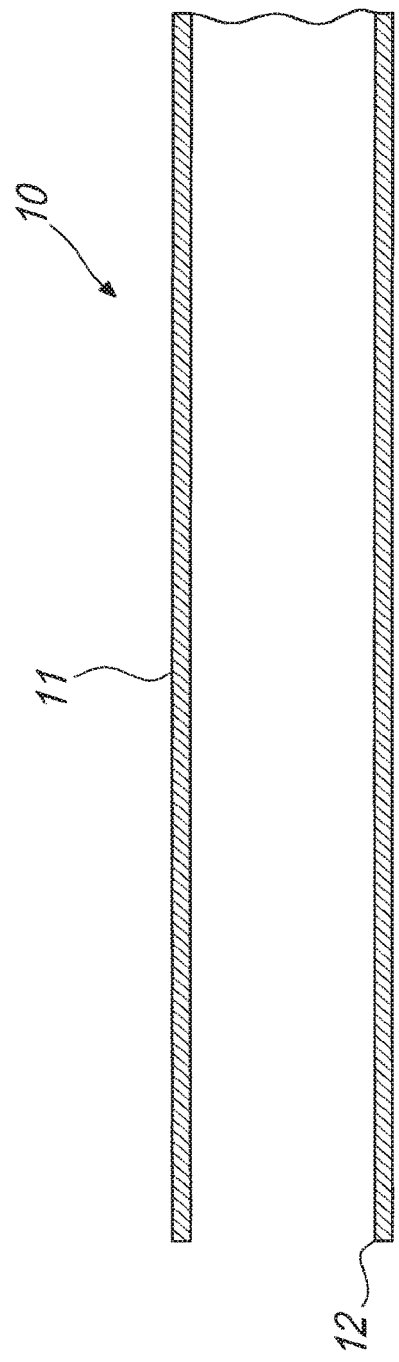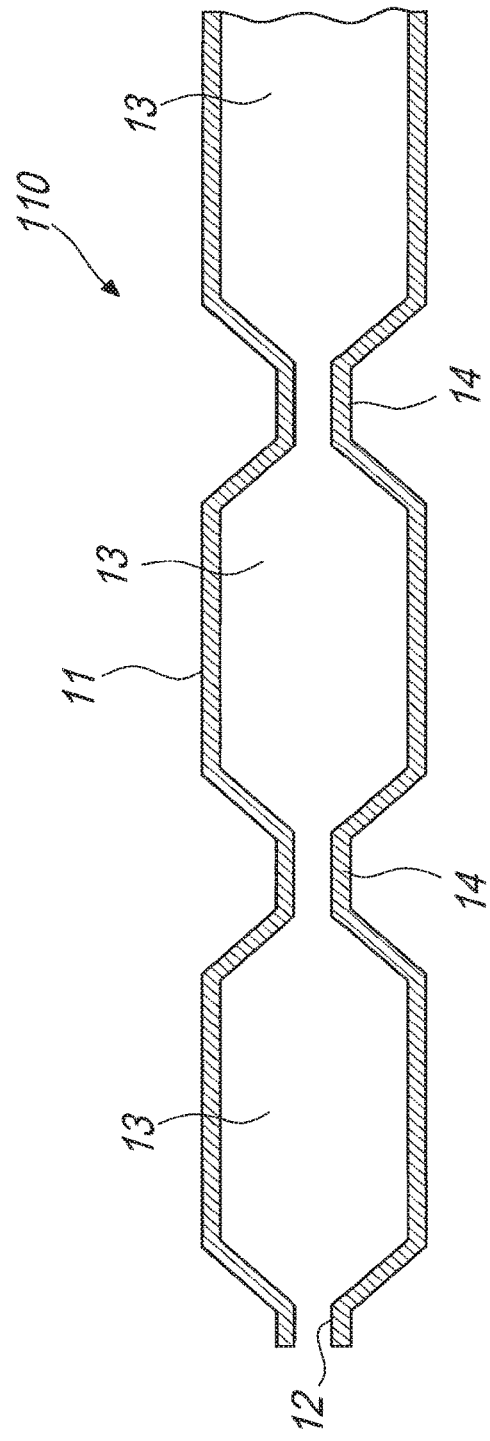

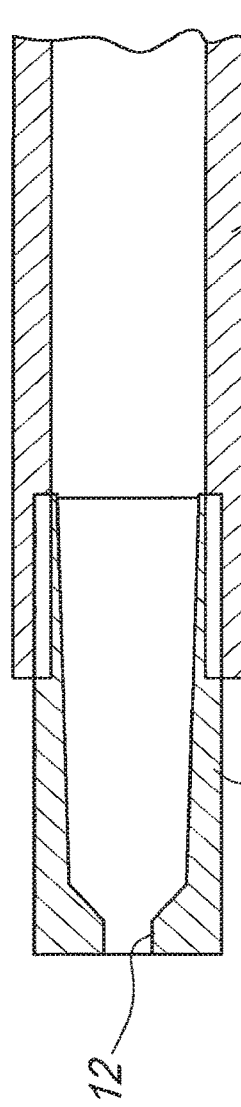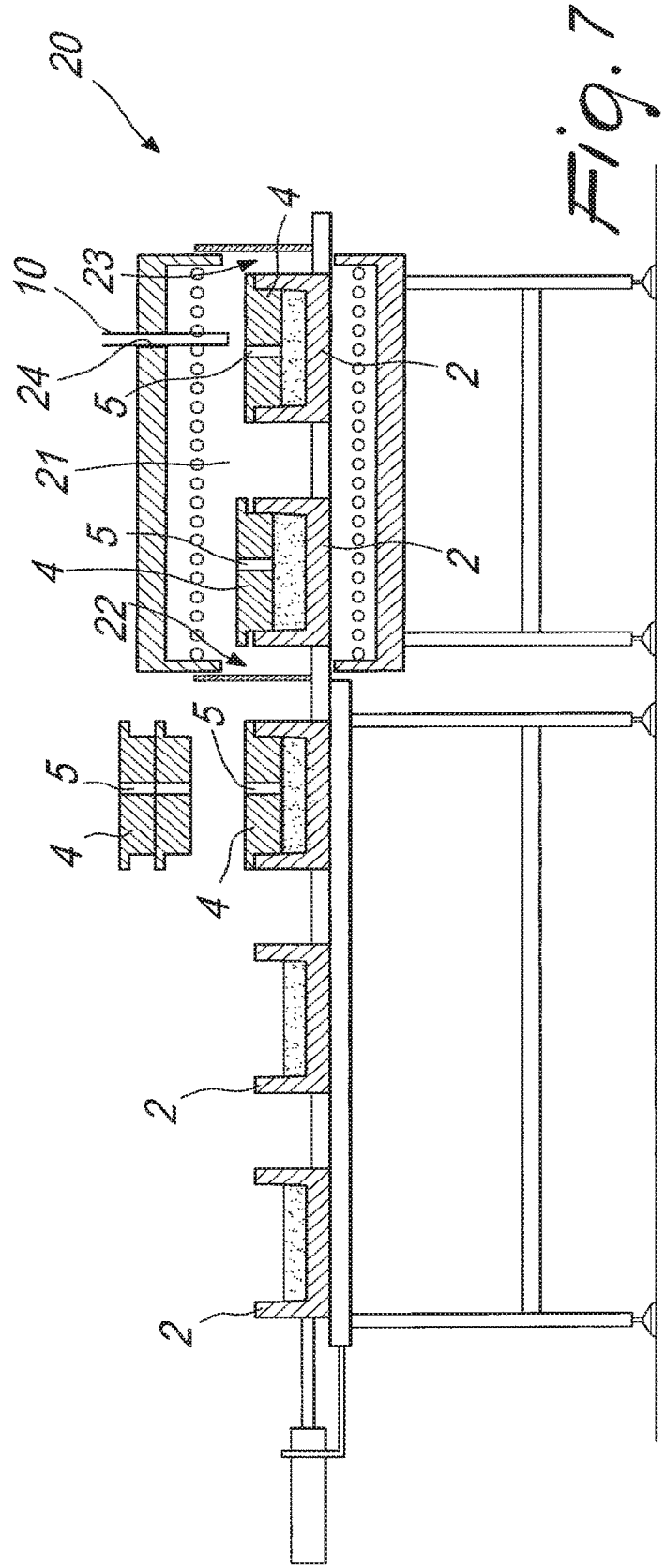

APPARATUS, PLANT AND METHOD FOR PRODUCING INGOTS AND METAL BARS AND FOR MONITORING THE QUALITY THEREOF

CROSS REFERENCE TO RELATED APPLICATIONS

This application is a divisional of U.S. application Ser. No. 15/308,773, filed Nov. 3, 2016, which is a national stage entry under 35 U.S.C. § 371 of International Application No. PCT/EP2015/000920 filed on May 5, 2015, and claims priority to and the benefit of the filing date of Italian (IT) Patent Application No. VI2014A000122, filed on May 6, 2014, the entire contents of which are incorporated by reference herein.

TECHNICAL FIELD

The present invention relates to an apparatus, a plant and a method for producing metal bars and ingots with quality monitoring.

The invention can be advantageously used in the production of ingots and bars made of precious metal, such as for example gold, silver, platinum and palladium, but also made of other metals such as copper, steel and others.

BACKGROUND

As is known, besides coining there are fundamentally two production methods for making ingots, or bars, made of gold or other precious metals: a traditional method, which entails pouring the molten metal by means of a crucible into a mold of suitable size (ingot mold), then leaving the molten metal to cool in air, making it solidify under the influence of flames generated by gas burners, or a more modern method, according to which granules, or other metal elements, are inserted in the mold and melted in a furnace, subsequently cooling the mold (and therefore also the molten metal contained therein) in a conveniently sized thermal containment environment.

More particularly, the second production system entails initially inserting calibrated quantities of the material to be melted in molds having a shape that is substantially complementary to that of the ingots, or bars, to be provided.

The material to be melted can be constituted, for example, by grains, powder, crystals or swarf of various sizes.

The molds are then inserted in tunnel furnaces, preferably of the induction type, where they are first heated up to the melting point of the metal and then cooled until the metal solidifies.

Recently, compliance with the technical standards set by the London Bullion Market Association (LBMA), i.e. the trade association in the field of the professional ingot market, was acknowledged also for the second of the two production methods described above for the production of ingots known as "good delivery".

It should be thus stressed that the LBMA also requires purity tests on manufactured ingots, regardless of the production method from which they originate.

For production systems that use crucibles, there are purity testing tools that are well standardized and recognized also by the LBMA.

As regards the production of ingots melted directly in the molds, this same Applicant recently made available an improved mold assembly for the production of ingots and bars made of precious metal, that allows to obtain a sample to be assayed during the forming of ingots, or bars, melted directly in the mold with a continuous and/or static process. Such assembly is advantageous but can be improved in some aspects.

The aim of the present invention is to provide an apparatus, a system and a method for producing ingots and metal bars with quality monitoring that allow to solve the problems linked to determining the degree of purity of ingots, or bars, melted directly in the mold with a continuous and/or static process.

SUMMARY

Within the scope of this aim, a particular object of the invention is to provide an apparatus, a system and a method that allow to draw a calibrated quantity of the melted material initially contained in the forming cavity of a mold, so as to generate a sample to be assayed.

A further object of the invention is to provide an apparatus, a system and a method in which the sample to be assayed is taken during melting, when all the material initially introduced in the mold is mixed uniformly, so as to have the same chemical-physical characteristics as the finished product.

Another object of the invention is to make available an apparatus, a system and a method which, by virtue of their particular constructive characteristics, can be technically validated by the LBMA.

Still another object of the present invention is to provide an apparatus and a system which, because of their particular constructive characteristics, are capable of giving the greatest assurances of reliability and safety in use.

This aim and these and other objects that will become better apparent hereinafter are achieved by an apparatus for producing metal bars and ingots with quality monitoring, comprising at least one mold comprising a body that forms at least one cavity for forming an ingot or a bar and at least one cover that is detachably associated with said body in order to upwardly close said cavity; said apparatus being characterized in that at least one of said body and said cover comprises at least one passage adapted to connect the inside of said cavity to the outside, also when said cover is associated with said body upwardly closing said cavity.

According to another important aspect, the apparatus for producing ingots and bars made of precious metal with quality monitoring is characterized in that it comprises a sample taking means for taking a sample of the melted metal contained in a mold; the mold being constituted essentially by a body that forms at least one cavity for forming an ingot, or a bar, and by at least one cover that is detachably associated with the body in order to upwardly close the cavity.

This aim and these objects are also achieved by a plant for producing metal bars and ingots with quality monitoring, comprising a melting station provided with at least one heating chamber adapted to accommodate at least one mold; said heating chamber being provided with at least one access opening that is controlled by at least one movable bulkhead; said mold being constituted by a body that defines at least one cavity for forming an ingot or a bar, and by at least one cover that is detachably associated with said body in order to upwardly close said cavity; said plant being characterized in that said heating chamber comprises at least one gap adapted to allow to reach said mold from the outside even when said access opening is substantially closed.

This aim and these and other objects are also achieved by a method for producing metal bars and ingots with quality monitoring, including the following operations:

introducing a precise amount of material to be melted into at least one cavity for forming an ingot, or a bar, formed in the body of a mold:

associating detachably at least one cover with the body so as to close the cavity in an upward region;

heating the mold until the material melts;

the method being furthermore characterized in that it takes a sample of the melted material contained in the cavity.

BRIEF DESCRIPTION OF THE DRAWINGS

Further characteristics and advantages will become better apparent from the description of preferred but not exclusive embodiments of an apparatus and a system according to the invention, illustrated by way of non-limiting example in the accompanying drawings, wherein:

FIG. 4 is a longitudinal sectional view of an embodiment of the sample taking means of the apparatus according to the invention;

FIG. 5 is a longitudinal sectional view of a further embodiment of the sample taking means;

FIG. 6 is a longitudinal sectional view of a further embodiment of the sample taking means;

FIG. 7 is a schematic view of a plant according to the invention;

DETAILED DESCRIPTION

Figure 1:
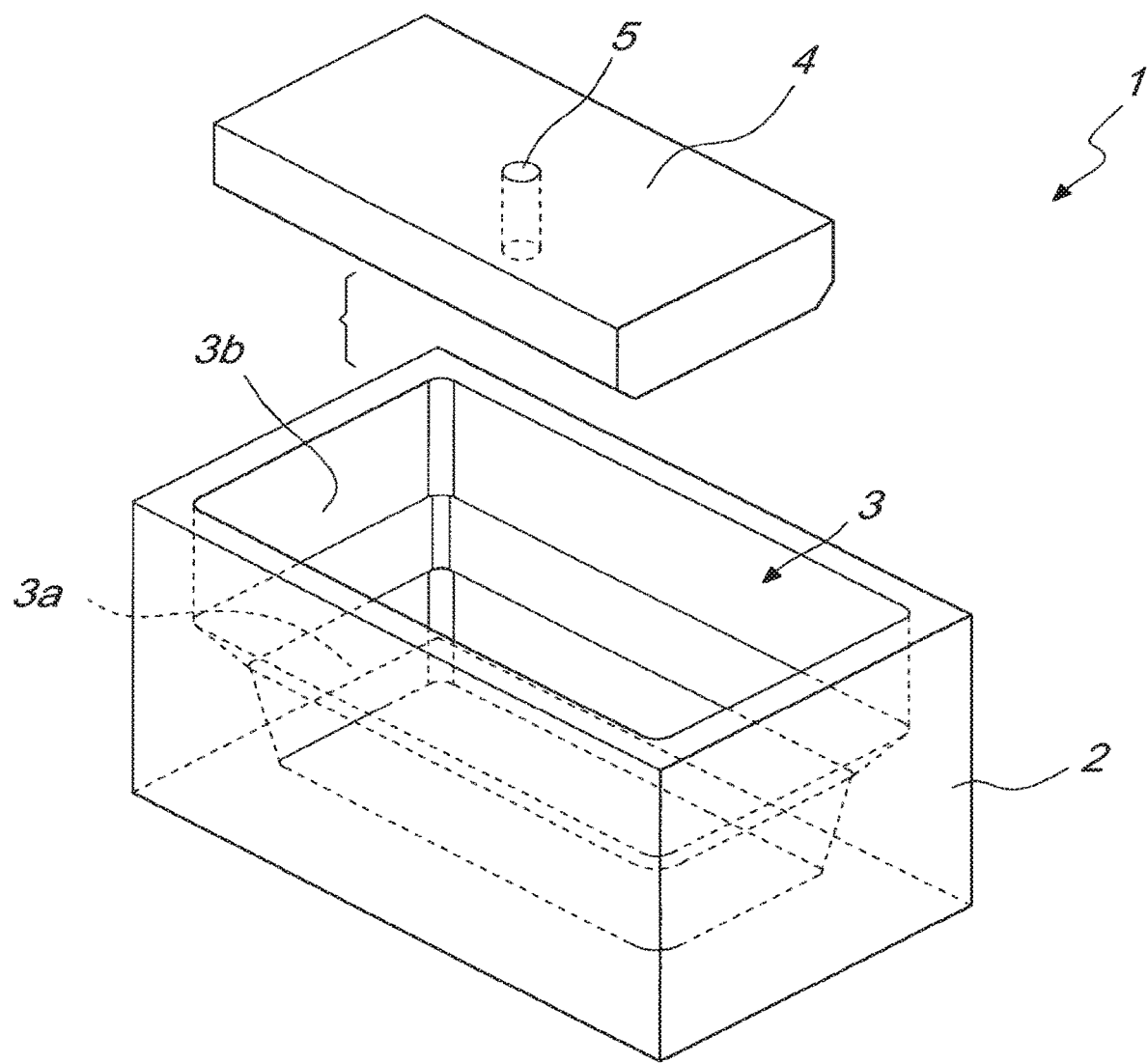
FIG. 1 is a perspective view of a portion of the apparatus according to the invention.
Figure 2:
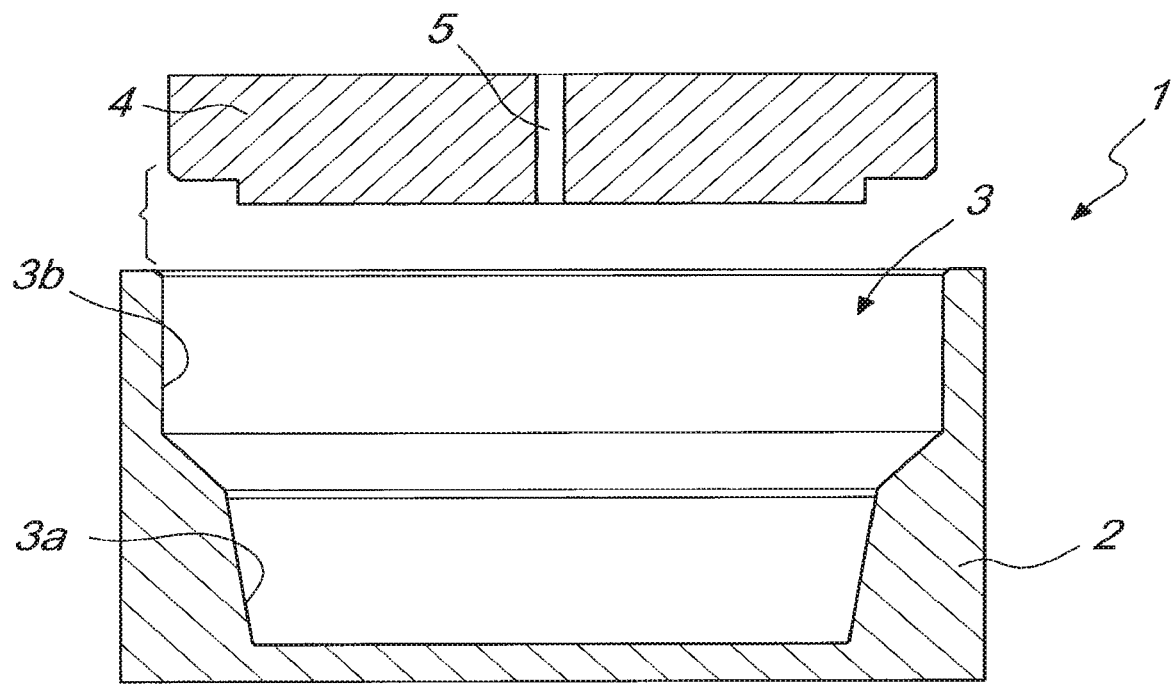
FIG. 2 is a longitudinal sectional view of the apparatus of the preceding figure.
Figure 3:
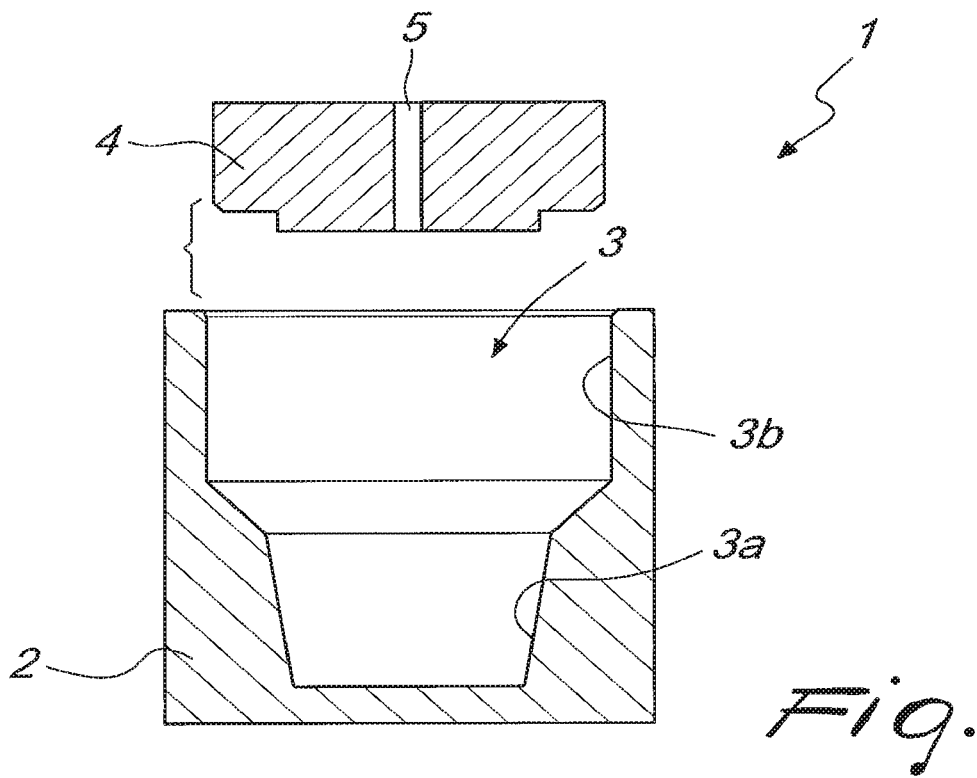
FIG. 3 is a cross section view of the apparatus of FIG. 1.
Figure 8:
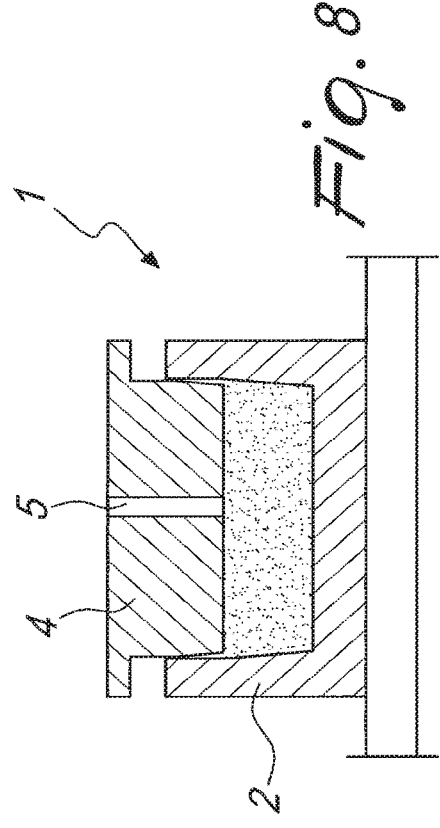
FIG. 8 is a sectional view of a mold used in the system according to the invention.

With reference to FIGS. 1 to 4, the apparatus for producing metal bars and ingots with quality monitoring, has a mold, globally designated by the reference numeral 1.

The mold 1 comprises a body 2 that forms at least one cavity 3, for forming an ingot, or a bar, and at least one removable cover 4, which is associated with the body 2 so as to upwardly close the cavity 3.

The cavity 3 has a lower portion 3a with a shape that is substantially complementary to the shape of the ingot, or of the bar, and an upper portion 3b with a shape adapted to facilitate the introduction of material to be melted constituted, for example, by grains, powder, crystals or swarf of various sizes.

In the shown example, the upper portion 3b has lateral surfaces that are at least partially inclined and converge toward the bottom of the cavity 3.

According to another aspect of the invention, the upper portion 3b may have lateral surfaces substantially at right angles to the bottom of the cavity 3.

Advantageously, the cover 4 is conceived so that it can pass from a first position, in which it rests on the material to be melted without however resting on the body 2, to a second position, in which it rests on the body 2, substantially completely closing the cavity 3.

In the second position, the cover 4 makes contact with different parts of the body 2, depending on how the mold 1 is built.

More precisely, if the cover 4 is without portions that protrude laterally, as shown in the figures, in the second position it might for example rest its sides, or a shank, on the inner walls of the cavity 3 or on an abutment defined inside it.

Otherwise, if the cover 4 is for example provided with a perimetric edge, in the second position the edge might rest on the upper end of the body 2.

Transition from the first position to the second position occurs during the melting, i.e. when the volume occupied by the mass of material to be melted reduces gradually.

According to a further embodiment, the cover 4 is conceived to rest on the body 2 from the beginning of the operation, so as to substantially completely close the cavity 3.

Conveniently, the body 2 and the cover 4 may be constituted by one or more components made for example of graphite, graphite mixes, silicon carbide or any other material that is compatible with the metal being melted and is resistant to high temperatures.

According to the present invention, the mold 1 has at least one passage 5 that allows to connect the inside of the cavity 3 to the outside, even when the cover 4 is associated with the body 2 and upwardly closes the cavity 3.

In the shown example, the mold 1 has a single passage 5 provided on the cover 4; however, according to other embodiments, not shown in the accompanying figures, the mold may have multiple passages formed both on the cover 4 and on the walls of the body 2.

According to a further aspect of the invention, the passage 5 may be formed in combination by slots provided respectively on the cover 4 and on the body 2.

Advantageously, the passage 5 is adapted to allow the insertion of a sample taking means in the cavity 3, for taking a sample of melted material, as will be described better hereinafter.

According to a further embodiment of the invention, not shown in the figures, the mold 1 also has a secondary cavity, which is connected to the cavity 3, for forming a sample to be assayed.

In this case, the passage 5 allows to insert a rod member in the cavity 3 creating a temporary rise of the level of the melted material, so as to transfer part of it into the secondary cavity.

The material transferred into the secondary cavity, by solidifying, forms a sample to be assayed which, depending on how the secondary cavity is arranged with respect to the cavity 3, is joined monolithically to the ingot, or the bar, or is detached.

According to a further aspect of the invention, the apparatus has a sample taking means, globally designated by the reference numeral 10 in FIG. 4, for taking a sample of the melted material contained in a mold.

The sample taking means 10 may be used substantially with any mold constituted by a body that forms at least one cavity for forming an ingot, or a bar, and by at least one cover that can be associated detachably with the body to close the cavity in an upward region.

However, preferably, the mold to which reference is made is substantially equivalent to the mold 1 that is the subject of the present patent application.

The sample taking means 10, therefore, can be inserted in the cavity 3 by means of the passage 5 provided on the cover 4, on the body 2 or on both.

It should be considered, however, that the sample taking means 10 can be inserted in the cavity 3 also by temporarily lifting the cover 4 and therefore the sample taking means may also be used in the case of molds that do not have the passage 5.

Specifically, the sample taking means 10 includes a substantially hollow container body 11 made of a material that is resistant to high temperatures.

Advantageously, the container body 11 has at least one opening 12 for introducing the melted material.

With reference to a preferred embodiment, the container body 11 is constituted by an elongated tubular body, made for example of quartz glass or of other materials with equivalent characteristics, provided with a through hole that crosses it longitudinally.

According to a further aspect of the invention, a sample taking means, globally designated by the reference numeral 110 in FIG. 5, comprises a tubular body that forms at least one small receptacle 13, at one end of which the opening 12 is formed.

The receptacle 13 is adapted to contain a calibrated quantity of the melted material initially contained in the cavity 3.

Preferably, the tubular body has a set of receptacles 13 arranged in succession and mutually connected by means of easily breakable ducts 14.

Advantageously, the container body 11 may be functionally connected to a depressurization means, which is not shown in the accompanying figures.

The depressurization means may be constituted by a vacuum pump with manual or automatic actuation, or by other technically equivalent devices.

The depressurization means has essentially the function of aspirating the gaseous medium contained in the container body 11, so as to draw a calibrated quantity of the melted material, initially contained in the cavity 3, into the container body 11.

Experimental tests and careful analysis of the results have allowed to observe that slim tubular bodies, for example with a diameter of a few millimeters, avoid, or in any case reduce, unwanted dripping of material outside the container body 1.

According to a further aspect of the invention, the tubular body is replaced by a vacuum test tube made of a material that is resistant to high temperatures.

Advantageously, at one end of the test tube there is an easily breakable region that is preset to break upon contact with the melted material, so as to form at least one opening for introducing the material.

This test tube is adapted to contain a calibrated quantity of the melted material initially contained in the cavity 3.

According to a further aspect of the invention, as schematically shown in FIG. 6, a sample taking means 210 comprises a container body 1 constituted by a hollow tip provided at one of its ends with at least one opening 12 for introducing the melted material.

Advantageously, this tip is conceived so as to contain a calibrated quantity of the melted material initially contained in the cavity 3.

The opposite end of the hollow tip is detachably associated with a tubular support 15 that is optionally connected to the depressurization means already mentioned earlier.

The hollow tip and the tubular support 15 are conveniently made of a material that is resistant to high temperatures, such as for example quartz glass, graphite, silicon oxide or other materials suitable for the purpose.

According to a further aspect of the invention, the container body is constituted by a concave shovel, made of a material that is resistant to high temperatures and associated with a suitable rod-like support.

Advantageously, the shovel is designed to contain a calibrated quantity of the melted material initially contained in the cavity.

According to a further aspect of the invention, the sample taking means 10 may be automated and directly associated with the body 2 or with the cover 4, so as to equip the mold 1 from the beginning of operations and automatically take samples of the melted material.

For the embodiments shown in FIGS. 5 and 6, the elements that correspond to the elements already described with reference to the embodiment shown in FIG. 4 have been designated by the same reference numerals.

According to a further aspect of the present invention, a plant for producing metal bars and ingots with quality monitoring, generally designated by the reference numeral 20, comprises a melting station constituted by a tunnel furnace, preferably of the induction type, that has at least one heating chamber 21 adapted to contain one or more molds filled with the material to be melted.

The heating chamber 21 is conveniently provided with an access opening 22 and an exit opening 23, the access of which is controlled by respective movable bulkheads.

According to a further aspect, the heating chamber 21 is provided with a single access opening, which is controlled by a movable bulkhead that acts alternatively as inlet and as outlet.

It is important to point out that the plant 20 can be used substantially with any mold constituted by a body that forms at least one cavity for forming an ingot, or a bar, and by at least one cover that can be associated removably with the body in order to close the cavity in an upward region.

However, the molds to which reference is being made are preferably equivalent to the mold 1 that is the subject of the present patent application.

According to the present invention, the heating chamber 21 has at least one gap 24 that allows to reach the mold 1 from the outside even when the access opening 22 and the exit opening 23 are closed by the respective movable bulkheads.

In practice, the gap 24 serves essentially to insert a sample taking means in the heating chamber 21 without having to open the movable bulkheads that close the access opening 22 and the exit opening 23. The sample taking means may be any of the ones described above.

Specifically, the gap 24 is formed in the body that forms the heating chamber 21. The sample taking means 10, 110 or 210, with which the plant 20 is equipped, may thus reach the mold 1 through the gap 24 and be inserted in the cavity 3 through the passage 5.

This solution allows to take a sample of material from the mold 1, the sample having the same chemical-physical characteristics as the ingot or bar and to use it for subsequent assaying.

Figure 9:
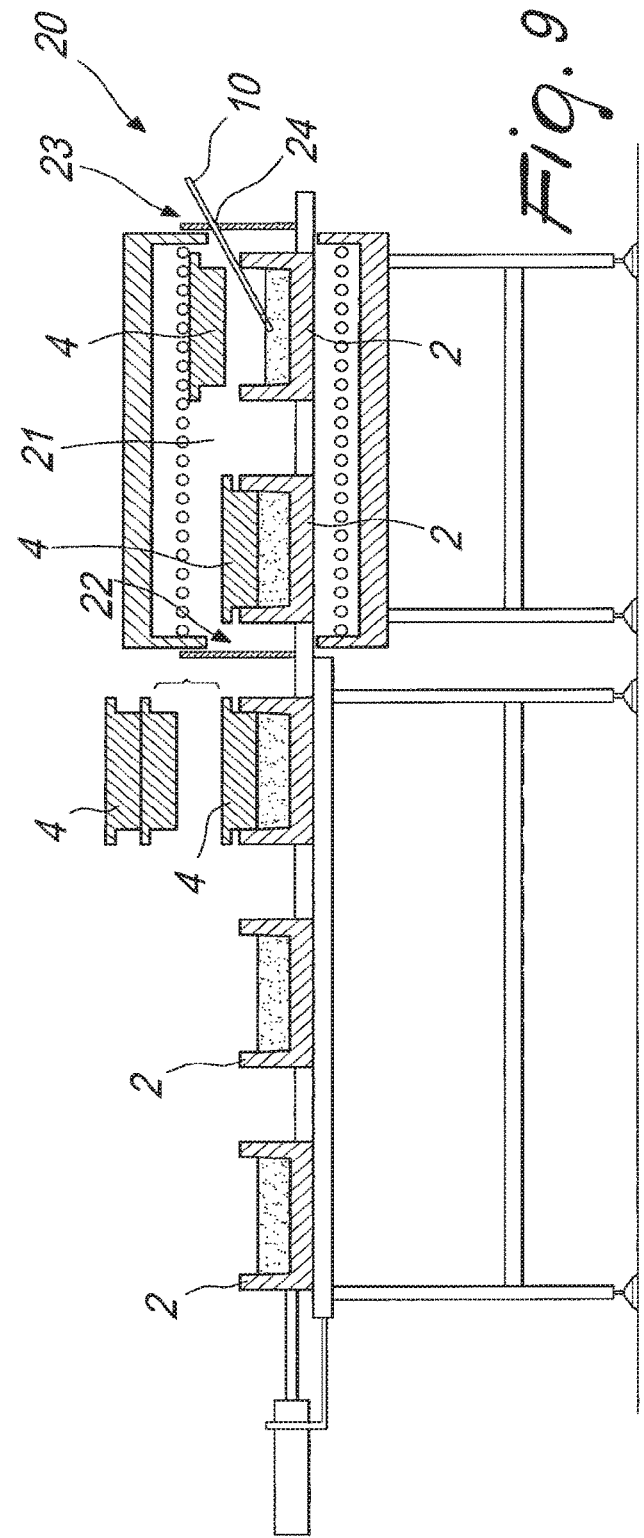
FIG. 9 is a schematic view of a further embodiment of the plant according to the invention.

According to the embodiment shown in FIG. 9, the gap 24 is formed in at least one of the movable bulkheads that control the access openings.

In this case, the sample taking means 10, 110 or 210 reaches the mold 1 by means of the gap 24 and is inserted in the cavity 3 after lifting the cover 4.

According to a further embodiment, the sample taking means 10, 110 or 210 is arranged inside the heating chamber 21.

As an alternative, the sample taking means 10, 110 or 210 may be introduced in the mold 1 after opening one of the openings of the heating chamber 21 or as soon as the mold 1 exits from the heating chamber 21.

The use of the apparatus and the operation of the plant, according to the present invention, are apparent from what has been described above.

In particular, in order to take a sample of the melted material contained in the cavity 3 of a mold 1, previously heated to the melting point of the metal contained therein, it is sufficient to use a sample taking means of the present invention by inserting it in the cavity 3 through the passage 5.

However, it should be considered that the sample taking means 10 may also be inserted in the cavity 3 by simply temporarily lifting the cover 4 and therefore can be used also in the case of molds that lack the passage 5.

For example, in the case of the sample taking means 10, the depressurization means aspirates the gaseous medium contained in the container body 11, so as to draw a calibrated quantity of the melted material, initially contained in the cavity 3, into the container body 11.

Once this material has solidified, it is sufficient to extract the sample formed in the container body 11 by breaking the tubular body or by extracting the sample from one of the two ends thereof.

In the case of the sample taking means 110, once the material drawn into the container body 11 has solidified it is sufficient to separate the receptacle 13, arranged at one end of the tubular body, from the others that, are optionally present, utilizing the easily breakable ducts 14.

In this manner a sample that can be easily assayed has been made available.

In the case of the sample taking means 210, this sample is formed in the hollow tip, which can be subsequently replaced with an empty tip.

It has been found that it is particularly advantageous to perform these operations by using a plant 20 that allows to automate the entire process; however other uses are advantageous; for example, the mold 1 is heated in a free space by using gas-fueled flames.

According to the present invention, a method for producing metal bars and ingots with quality monitoring, comprises taking a sample of the melted material contained in a mold essentially constituted by a body that forms at least one cavity for forming an ingot, or a bar, and by at least one cover that is associated detachably with the body in order to close the cavity in an upward region.

This method can be performed by means of any apparatus and any system suitable for the purpose, but preferably is provided by means of the apparatus and the system according to the present patent application.

In particular, the method starts with a first step that entails introducing a precise quantity of material to be melted into the cavity for forming an ingot, or a bar, formed in the body of a mold; the precise quantity of material to be melted is for example constituted by grains, powder, crystals or swarf of various sizes.

This cavity is then closed by means of an adapted cover that rests on the material to be melted, so as to compress it, without however abutting.

The heating of the mold and the consequent melting of the material contained in the cavity begin at this point.

By melting, the material gradually reduces its volume and causes the lowering of the cover, which closes the cavity substantially completely.

According to the invention, the method comprises a further step that consists in taking a sample of the melted material contained in the cavity of the mold.

Advantageously, the sample taking operation is performed by keeping the cover in the previously reached closed position.

Operatively, sample taking occurs through a suitable sample taking means, adapted to take a calibrated quantity of the melted material contained in the cavity, which is introduced in the mold through a passage formed in the mold.

This passage has the function of connecting the inside of the cavity to the outside even when the cover is associated with the body of the mold to close the cavity in an upward region.

According to a further aspect of the invention, the sample taking operation is performed by lifting the cover and by introducing the sample taking means in the mold. The sample taking means extracts a calibrated quantity of the melted material contained in the cavity.

As an alternative, the sample taking means is associated with the mold, equipping it in a substantially stable manner.

It has been found in practice that the invention achieves the intended aim and objects, providing an apparatus, a plant and a method for producing metal bars and ingots with quality monitoring that solve the problem of determining the degree of purity of ingots or bars melted directly in the mold with a continuous and/or static process.

In fact, the apparatus, the plant and the method according to the invention allow to take a calibrated quantity of the melted material, initially contained in the forming cavity of a mold, so as to generate a sample to be assayed.

Advantageously, since the sample is taken during melting, i.e. when all the material initially introduced in the mold is mixed uniformly, it has the same chemical-physical characteristics as the finished product and therefore can be used to determine the degree of purity of the finished product in a reliable manner.

The invention claimed is:

1. An apparatus for producing precious metal bars and ingots with quality monitoring, comprising:
    a sample taking device for taking a sample of melted material contained in a mold, said mold comprising a body forming a cavity for forming an ingot or a bar and a cover detachably coupled to said body to upwardly close said cavity,
    wherein said sample taking device is inserted in said cavity using a passage that is provided in said mold in order to connect an inside of said cavity to an outside of said mold, even when said cover is coupled to said body to upwardly close said cavity.

2. The apparatus according to claim 1, wherein said sample taking device is inserted in said cavity by lifting said cover so as to open said cavity temporarily.

3. The apparatus according to claim 1, wherein said sample taking device comprises a substantially hollow container body that is made of a material resistant to at least the temperature of the melted material, said container body having an opening for inserting the melted material.

4. The apparatus according to claim 3, wherein said container body comprises an elongated tubular body made of a material resistant to at least the temperature of the melted material, said tubular body including a through hole formed longitudinally therein, said opening for the entry of the melted material being formed at a first end of said tubular body.

5. The apparatus according to claim 4, wherein said tubular body comprises a receptacle connected to said opening for the entry of the melted material and preset to contain a calibrated quantity of the melted material contained initially in said cavity.

6. The apparatus according to claim 4, wherein said tubular body comprises a plurality of receptacles arranged in succession, said receptacles being mutually connected by breakable ducts.

7. The apparatus according to claim 3, wherein said sample taking device comprises a depressurization unit functionally connected to said container body, said depressurization unit being preset to aspirate a gaseous medium contained in said container body so as to draw a calibrated quantity of the melted material, initially contained in said cavity, into said container body.

8. The apparatus according to claim 7, wherein said depressurization unit comprises a vacuum pump, the vacuum pump being operated manually or automatically.

9. The apparatus according to claim 3, wherein said container body comprises a vacuum test piece made of a material resistant to at least the temperature of the melted material, a breakable region provided at a first end of said vacuum test piece being preset to break upon contact with said melted material to form at least one opening for the inflow of the melted material, said vacuum test piece being configured to contain a calibrated quantity of the melted material initially contained in said cavity.

10. The apparatus according to claim 3, wherein said container body comprises a hollow tip made of a material resistant to at least the temperature of the melted material and removably associated with a tubular support, at least one opening for inserting the molten material being formed at a first end of said hollow tip, said hollow tip being preset to contain a measured quantity of the molten material contained initially in said cavity.

11. The apparatus according to claim 3, wherein said container body comprises a concave shovel made of a material resistant to at least the temperature of the melted material and associated with a rod-shaped support, said shovel being preset to contain a calibrated quantity of the melted material initially contained in said cavity.

12. The apparatus according to claim 11, wherein said sample taking device is associated with said mold.

\* \* \* \* \*